United States Patent
Hakkola

(10) Patent No.: US 11,258,643 B1
(45) Date of Patent: Feb. 22, 2022

(54) FREQUENCY MODULATION TRACKING FOR BAND REJECTION TO REDUCE DYNAMIC RANGE

(71) Applicant: Silicon Laboratories Inc., Austin, TX (US)

(72) Inventor: Alexander August Arthur Hakkola, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/323,782

(22) Filed: May 18, 2021

(51) Int. Cl.
*H04B 1/10* (2006.01)
*H04L 27/14* (2006.01)

(52) U.S. Cl.
CPC ........... *H04L 27/14* (2013.01); *H04B 1/10* (2013.01)

(58) Field of Classification Search
CPC ......... H04L 27/14; H04B 1/10; H04B 1/1027; H04B 1/1036; H04B 1/1063
See application file for complete search history.

(56) References Cited

U.S. PATENT DOCUMENTS

| | | | | |
|---|---|---|---|---|
| 2005/0190867 A1* | 9/2005 | Sobchak | ............... | H04B 1/1036 375/346 |
| 2007/0047681 A1* | 3/2007 | Chan | ................... | H04B 1/1036 375/350 |
| 2014/0369452 A1* | 12/2014 | Dubash | ..................... | G01S 5/00 375/350 |
| 2020/0235973 A1* | 7/2020 | Wang | .................... | H04L 27/264 |

OTHER PUBLICATIONS

Silicon Laboratories Inc., "Si47961-62 Data Short," Rev 1.3, downloaded from www.silabs.com on Apr. 21, 2021, 5 pages.

\* cited by examiner

*Primary Examiner* — Siu M Lee
(74) *Attorney, Agent, or Firm* — Zagorin Cave LLP

(57) ABSTRACT

In at least one embodiment of the invention, a method for reducing a dynamic range of a received radio frequency signal includes receiving digital IQ signals corresponding to an in-phase component of the received radio frequency signal and a quadrature component of the received radio frequency signal. The method includes demodulating the digital IQ signals to generate an instantaneous frequency signal. The method includes selecting a center frequency of a selectable filter according to whether an interfering signal is detected in a target frequency band of the received radio frequency signal. The center frequency is selected from a predetermined frequency and an estimated center frequency determined using the instantaneous frequency signal. The method includes filtering the digital IQ signals using the selectable filter configured using the center frequency to generate output digital IQ signals.

20 Claims, 5 Drawing Sheets

FREQUENCY MODULATION TRACKING FOR BAND REJECTION TO REDUCE DYNAMIC RANGE

BACKGROUND

Field of the Invention

The invention relates to communications technology and more particularly to communication using radio technology.

Description of the Related Art

Operation of a radio receiver in a noisy environment introduces noise into the received signal. In an exemplary radio application, a desired modulated radio frequency signal is corrupted by a substantial interfering signal (e.g., a constant tone or a modulated signal in the target frequency band). For example, a constant tone may be introduced as a result of operating an electric motor proximate to the radio receiver or a modulated interfering signal may be introduced into the received signal by operating the radio receiver near a radio using a different communications protocol. A substantial interfering signal in the target frequency band may increase the dynamic range of the received signal beyond the dynamic range needed to represent the desired information in the received signal. Accordingly, transmission of the received signal having that increased dynamic range, e.g., to an external demodulator, may require a transceiver to operate at a higher data rate, use a faster clock signal, or communicate more information than needed to recover the desired information. Accordingly, techniques for reducing the dynamic range of a received radio frequency signal are desired.

SUMMARY OF EMBODIMENTS OF THE INVENTION

In at least one embodiment of the invention, a method for reducing a dynamic range of a received radio frequency signal includes receiving digital IQ signals corresponding to an in-phase component of the received radio frequency signal and a quadrature component of the received radio frequency signal. The method includes demodulating the digital IQ signals to generate an instantaneous frequency signal. The method includes selecting a center frequency of a selectable filter according to whether an interfering signal is detected in a target frequency band of the received radio frequency signal. The center frequency is selected from a predetermined frequency and an estimated center frequency determined using the instantaneous frequency signal. The method includes filtering the digital IQ signals using the selectable filter configured using the center frequency to generate output digital IQ signals.

In at least one embodiment, a receiver includes a receiver signal path configured to provide digital IQ signals corresponding to an in-phase component of a received radio frequency signal and a quadrature component of the received radio frequency signal. The receiver includes a demodulator configured to provide an instantaneous frequency signal based on the digital IQ signals. The receiver includes a selectable filter configured to provide output digital IQ signals based on the digital IQ signals and a center frequency. The receiver includes a select circuit configured to select the center frequency of the selectable filter according to whether an interfering signal is detected in a target frequency band of the received radio frequency signal. The center frequency is selected from a predetermined frequency and an estimated center frequency determined using the instantaneous frequency signal.

In at least one embodiment, a program product is encoded in a tangible machine-readable medium. The program product includes instructions executable by a processor to: receive digital IQ signals corresponding to an in-phase component of a received radio frequency signal and a quadrature component of the received radio frequency signal; demodulate the digital IQ signals to generate an instantaneous frequency signal; select a center frequency of a selectable filter according to whether an interfering signal is detected in a target frequency band of the received radio frequency signal, the center frequency being selected from a predetermined frequency and an estimated center frequency determined using the instantaneous frequency signal; and filter the digital IQ signals using the selectable filter to generate an output digital signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
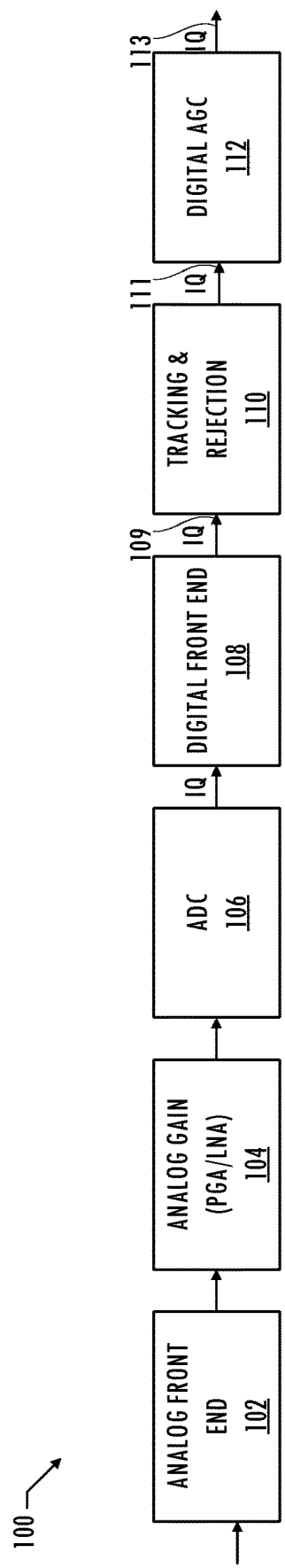
FIG. 1 illustrates a functional block diagram of an exemplary receiver signal path including a tracking and rejection filter consistent with at least one embodiment of the invention.

Referring to FIG. 1, an exemplary radio receiver receives a radio frequency (RF) signal and detects one or more target signal carrier frequencies (e.g., one or more subcarriers) that carry information. Analog front end 102, which may include an impedance matching network coupled to a low-noise amplifier, receives the RF signal from an antenna and amplifies the RF signal without substantial degradation to the signal-to-noise ratio. In at least one embodiment, analog front end 102 includes a frequency mixer that translates RF signal frequencies to a low-intermediate frequency. Analog front end 102 amplifies and filters the signal (e.g., using an image rejection filter) and provides an in-phase (I) signal, and a quadrature (Q) signal (i.e., IQ signals) as the output. The IQ signals are analog time-domain signals. In at least one embodiment, analog gain circuit 104 provides amplified versions of the IQ signals to analog-to-digital converter (ADC) 106. Analog-to-digital converter 106 converts those versions of the IQ signals to digital IQ signals (i.e., IQ samples). Exemplary embodiments of ADC 106 use a variety of signal conversion techniques (e.g., delta-sigma (i.e., sigma-delta) analog to digital conversion).

ADC 106 provides the digital IQ signals to digital front end 108, which filters the digital received signal. In at least one embodiment, digital front end 108 decimates the digital received signal after filtering the digital received signal. When an undesired constant tone or other interference present in the desired bandwidth is relatively large as compared to the desired signal, the dynamic range required to support communications is relatively large. To send the entire signal to an external processor would increase the number of bits required as compared to sending the desired signal in the absence of the undesired constant tone or other interference, thereby requiring a higher clock rate and communicating more information than needed. Tracking and rejection filter 110 detects that RF noise and estimates a center frequency of the interfering signal. Tracking and rejection filter 110 includes a selectable filter (e.g., a notch filter or a band rejection filter) that is configured using a selected center frequency to attenuate that RF interferer. Digital automatic gain control 112 dynamically amplifies the digital signal to provide IQ samples at signal amplitudes suitable for a next receiver stage (e.g., an external demodulator or a filter that combines signals from multiple antennas). In at least one embodiment, receiver 100 sends the IQ output to an external processor for demodulation (e.g., a demodulator compliant with National Radio System Coimmittee-5C, also known as HD™ Radio, Digital Audio Broadcasting, Digital Radio Module (DRM), or other digital radio technology).

In at least one embodiment, tracking and rejection filter 110 reduces the bandwidth required to transmit the desired data across a communications channel. Tracking and rejection filter 110 attenuates an interfering constant tone or interfering modulated signal from the received signal. In at least one embodiment, the interfering constant tone or modulated signal does not occur at predetermined frequency and the location of such interference varies. Accordingly, tracking and rejection filter 110 receives the IQ samples, detects any interfering signal, estimates a center frequency of the interfering signal, and attenuates the interfering signal to reduce the bandwidth required to convey the desired data to a next stage of the receiver, which in some embodiments, is across a communication channel.

Figure 2:
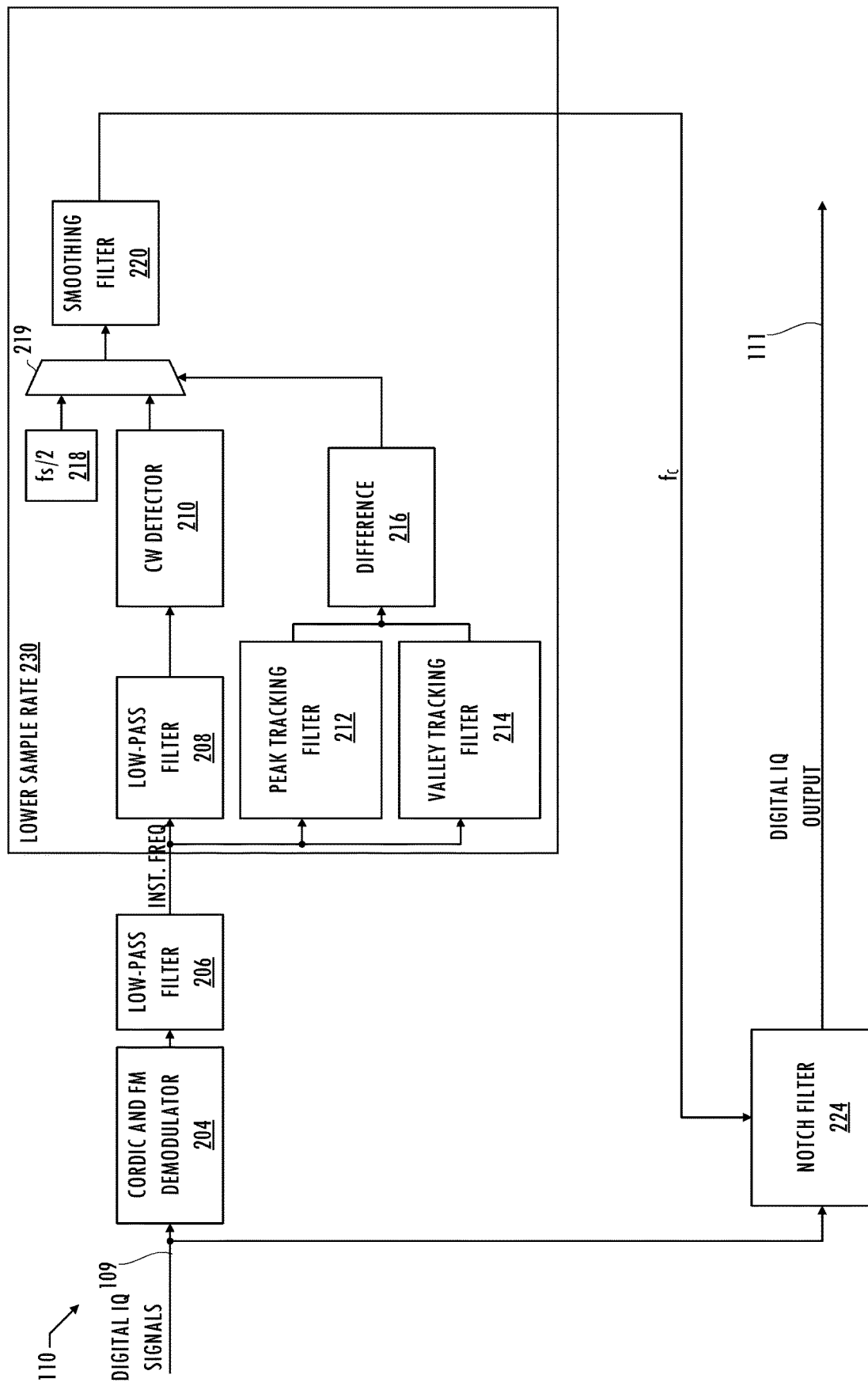
FIG. 2 illustrates a functional block diagram of an exemplary tracking and rejection filter including a selectable notch filter for reducing the dynamic range of a received signal consistent with at least one embodiment of the invention.

Referring to FIGS. 1 and 2, in at least one embodiment, tracking and rejection filter 110 receives digital IQ signals 109 (e.g., a sampled Frequency Modulation (FM) signal) from digital front end 108. Tracking and rejection filter 110 tracks a non-modulated signal (e.g., a carrier wave or constant tone) in the digital IQ signals and attenuates or eliminates the non-modulated signal to provide the digital IQ output. CORDIC and FM demodulator 204 receives the digital IQ signals, and processes those samples to generate an instantaneous frequency signal. In at least one embodiment, CORDIC and FM demodulator 204 converts the digital IQ signals from a Cartesian representation to a polar representation (i.e., instantaneous phase in units of radians and instantaneous amplitude) and uses polar discriminator techniques on successive complex-valued baseband FM samples to obtain an instantaneous frequency signal of the digital IQ signals.

In at least one embodiment, CORDIC and FM demodulator 204 includes a COordinate Rotation DIgital Computer (CORDIC), which may be dedicated to demodulation or shared with other operations of the receiver. In general, a CORDIC implements known techniques to perform calculations, including trigonometric functions and complex multiplies, without using a multiplier. The only operations the CORDIC uses are addition, subtraction, bit-shift, and table-lookup operations to implement an arctangent function to convert a Cartesian representation of a signal to a polar representation of the signal and in some embodiments, also converts a polar representation of a signal to a Cartesian representation. In other embodiments of tracking and rejection filter 110, instead of using a CORDIC, a complex multiplier computes a complex multiplication of current digital IQ signals with a complex conjugate of most recent prior digital IQ signals. In other embodiments, a digital signal processor executing firmware performs the conversion and into polar representation and FM demodulation. CORDIC and FM demodulator 204 converts the phase into a signal that is equivalent of the frequency offset from a 0 Hz signal at the input to the CORDIC. The output of CORDIC and FM demodulator 204 is an audio signal equivalent to the polar domain signal and has units of radian Hz.

In at least one embodiment, low-pass filter 206 reduces noise in the instantaneous frequency signal and lowers the sample rate to reduce the number of cycles needed by subsequent calculations. Although reducing the sample rate reduces the accuracy with which deviation of the FM signals is measured, in at least some embodiments, high accuracy is not needed to track that deviation. In other embodiments, low-pass filter 206 is excluded and operations of lower sample rate filter 230 occur at the sample rate of digital IQ signals 109.

In at least one embodiment, lower sample rate filter 230 low pass filters the lower sample rate signal using low-pass filter 208. Carrier wave detector 210 provides, to select circuit 219, an indication of the frequency of an interfering carrier wave in the received signal. Storage location 218 provides a predetermined value corresponding to the Nyquist frequency (i.e., $f_S/2$) to select circuit 219. In at least one embodiment, difference circuit 216 provides a confidence level generated by computing a difference between a peak frequency deviation (i.e., a maximum value of the frequency above the modulation frequency) provided by peak tracking filter 212 and a valley frequency deviation (i.e., a minimum value of the frequency below a modulation frequency) provided by valley filter 214. In at least one embodiment of lower sample rate filter 230, the peak tracking filter 212 and valley tracking filter 214 are dual-time constant low pass filters. Difference circuit 216 outputs a control signal indicative of the difference between the output of peak tracking filter 212 and valley tracking filter 214, which is indicative of a frequency deviation of the received signal. If the deviation is relatively large, then the received signal is not likely to include a constant tone interferer. If the deviation is relatively small, then the received signal likely includes a constant tone interferer.

In at least one embodiment, select circuit 219 compares a predetermined threshold value (e.g., 75 Hz) to the control signal generated by difference circuit 216. That control signal is indicative of a level of confidence that an interfering carrier wave or interfering constant tone is detected in the target frequency band of the received signal. If the confidence level is greater than or equal to the predetermined threshold value, then select circuit 219 provides the indication of the frequency location of the interfering carrier wave as the output filter center frequency. If the confidence level is less than the predetermined threshold value, then select circuit 219 provides the predetermined frequency stored in storage element 218, e.g., the Nyquist frequency (i.e., $f_S/2$, where $f_S$ is the sample rate) as center frequency $f_C$ of notch filter 224.

In at least one embodiment, smoothing filter 220 receives the output of select circuit 219 and provides an output with reduced random fluctuations as center frequency $f_C$ of notch filter 224, which uses center frequency $f_C$ to center a corresponding notch (e.g., a second order complex notch) at that frequency. In at least one embodiment, notch filter 224 is a first order notch filter and a convolution of a predetermined notch filter with center frequency $f_C$ is used to vary the frequencies that are attenuated. In at least one embodiment, notch filter 224 attenuates frequencies at the center frequency in the signal path and provides the filtered output as digital IQ signals 111. Note that in the embodiment of FIG. 2, the notched filter runs even when no interfering carrier wave is detected, but the notch is located at or near Nyquist frequency $f_S/2$. Centering notch filter 224 at the Nyquist frequency allows the filter to process digital IQ signals 109 without substantially impacting digital IQ signals 111 in the absence of interference and reduces the introduction of discontinuities in digital IQ signals 111 (e.g., a phase transition or other non-linearity) as compared to an implementation that disables notch filter 224 in the absence of interference.

Figure 3:
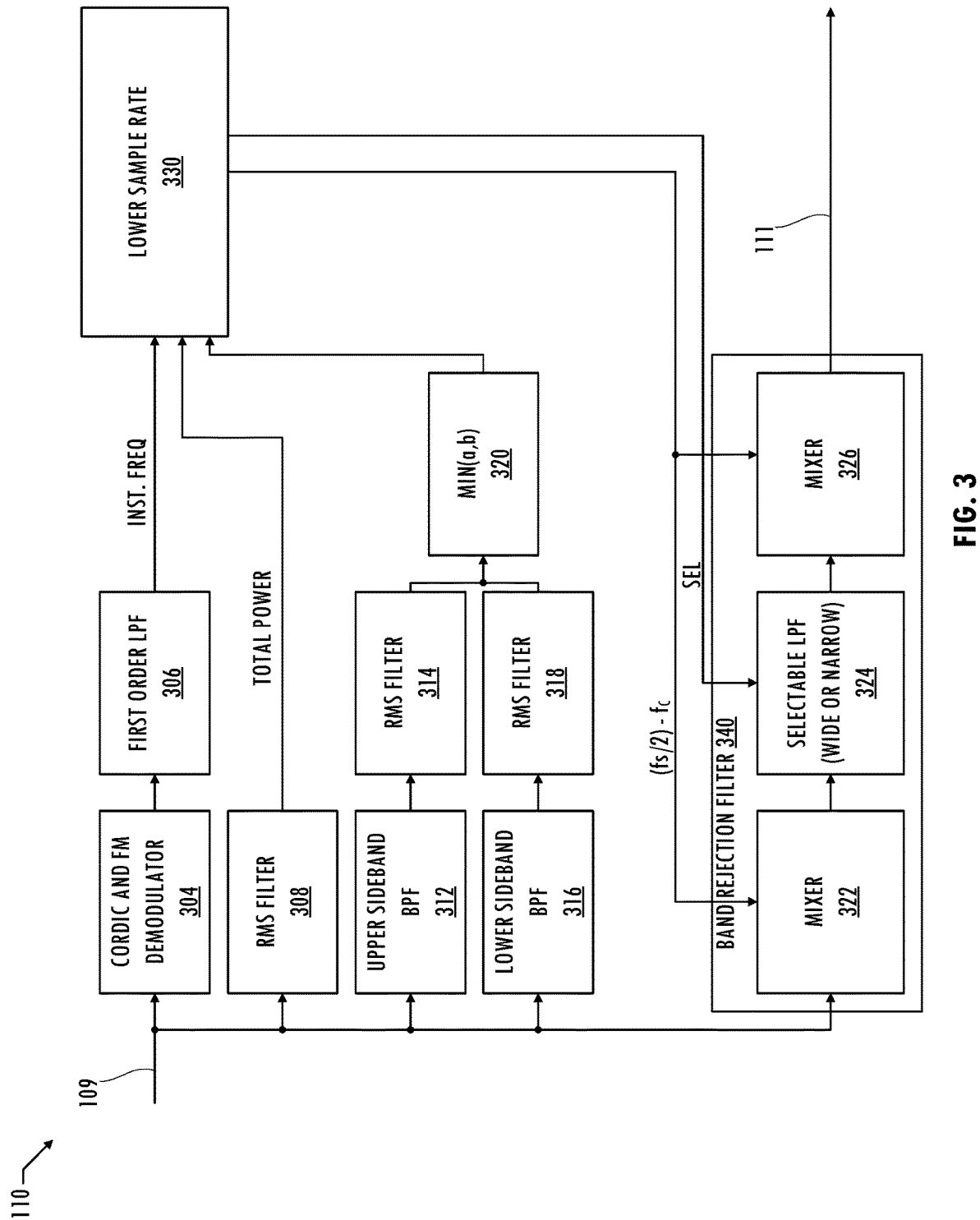
FIG. 3 illustrates a functional block diagram of an exemplary tracking and rejection filter portion including a selectable band rejection filter consistent with at least one embodiment of the invention.
Figure 4:
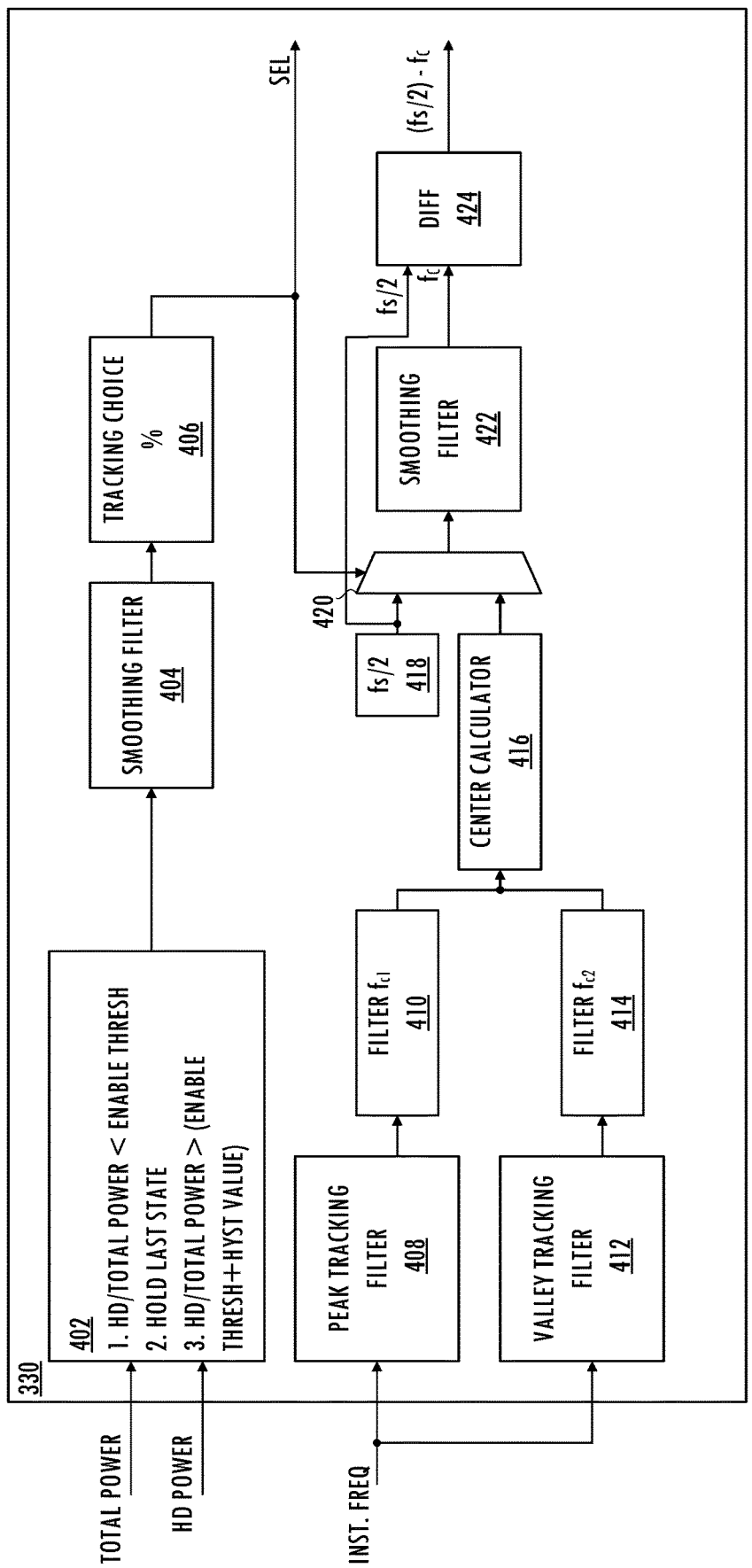
FIG. 4 illustrates a functional block diagram of a reduced sample rate portion of the exemplary tracking and rejection filter consistent with at least one embodiment of the invention.

Referring to FIGS. 1, 3, and 4, in at least one embodiment of tracking and rejection filter 110, rather than detect only an interfering carrier wave and attenuating the detected interfering carrier wave, tracking and rejection filter 110 detects an interfering carrier wave or interfering modulated data in a target frequency band and applies a band rejection filter to the received signal to attenuate the interfering signal in the target frequency band. CORDIC and FM demodulator 304 receives the digital IQ signals, and processes those samples. In at least one embodiment, CORDIC and FM demodulator 304 converts the digital IQ samples from a Cartesian representation to a polar representation (i.e., instantaneous phase in units of radians and instantaneous amplitude) and uses polar discriminator techniques on successive complex-valued baseband FM samples to obtain the instantaneous frequency of the sampled FM signal.

In at least one embodiment, CORDIC and FM demodulator 304 includes a CORDIC, which may be dedicated to demodulation or shared with other operations of the receiver. CORDIC and FM demodulator 304 converts the phase into a signal that is equivalent of the frequency offset from a 0 Hz signal at the input to the CORDIC. The output of CORDIC and FM demodulator 304 is an audio signal equivalent to the polar domain signal and has units radian Hz. In at least one embodiment, low-pass filter 306 reduces noise in the instantaneous frequency signal and lowers the sample rate to reduce the number of cycles needed by subsequent processing. Although reducing the sample rate reduces the accuracy with which deviation in the FM signals is detected, in at least some embodiments, high accuracy is not needed to track that deviation. In other embodiments, low-pass filter 306 does not reduce the sample rate and processing of lower sample rate filter 330 occurs at sample rate $f_S$. Accordingly, the interference tracking at sample rate $f_S$ to identify a corresponding center frequency for a notch filter or band-rejection filter is a more expensive implementation (e.g., requires more cycles of a processor).

RMS filter 308 performs a root-mean squared operation on digital IQ signals 109 to provide a value corresponding to the total power of the received signal. Upper sideband bandpass filter 312 is centered around an upper sideband of digital IQ signals 109. RMS filter 314 estimates the power of the upper sideband signal by performing a root-mean squared operation on the output of bandpass filter 312. Lower sideband bandpass filter 316 is centered around a lower sideband of digital IQ signals 109. RMS filter 318 estimates the power of the lower sideband signal by performing a root-mean squared operation on the output of bandpass filter 316. A minimum function circuit 320 provides a value corresponding to the minimum value of the lower sideband power and the upper sideband power as an indication of the power of the target received signal.

In at least one embodiment, lower sample rate filter 330 calculates a ratio of the power of the target received signal to the total power of the received signal. Comparator 402 calculates that ratio, compares the ratio to predetermined filter enable threshold level, and outputs a decision signal. Smoothing filter 404 filters the output stream of bits provided by comparator 402 and provides the filtered output stream to tracking choice percentage filter 406, which calculates a percentage likelihood that the received signal includes an interfering signal. That percentage is used to generate control signal SEL that selects a center frequency of a band-rejection filter 340. If the decision signal provided by smoothing filter 404 indicates that the power ratio is less than the predetermined filter enable threshold level then the output signal is an active signal level (i.e., effectively enables the selectable band rejection filter). If the power ratio is greater than the sum of the predetermined filter enable threshold level and a hysteresis value, then the output signal is an inactive signal level (i.e., effectively disabling the band rejection filter). If the power ratio is between or equal to the predetermined filter enable threshold level and the predetermined filter enable threshold level plus a hysteresis value then the output signal holds its prior value.

In at least one embodiment of lower sample rate filter 330, peak tracking filter 408 is a dual time constant, low-pass, filter that tracks the outer deviation of the FM signal (i.e., a maximum value of the frequency above the modulation frequency) and valley tracking filter 412 is a dual time constant, low-pass filter that tracks an inner deviation of the FM signal (i.e., a minimum value of the frequency below the modulation frequency). Low-pass filter 410 and low pass filter 414 attenuate noise in the output of peak tracking filter 408 and noise in the output of valley tracking filter 412, respectively. Center calculator 416 estimates the nominal center or carrier frequency of the interfering modulated signal, e.g., by computing a difference between the frequency output of low-pass filter 410 and the frequency output of low-pass filter 414. In at least one embodiment of lower sample rate filter 330, center calculator 416 uses a wrapping calculation (i.e., circular arithmetic) to account for aliasing since the frequency outputs of low pass filter 410 and low-pass filter 414 are with respect to reduced sample rate signals. If the percentage likelihood that the received signal includes an interfering signal is less than a predetermined percentage (e.g., 80%), then selection signal SEL causes select circuit 420 to provide a predetermined frequency stored in storage element 218, e.g., the Nyquist frequency (i.e., $f_S/2$) as center frequency $f_C$ of band rejection filter 340. If the percentage is greater than or equal to the predetermined percentage (e.g., 80%), then selection circuit SEL causes select circuit 420 provides the estimated center frequency as determined by center calculator 416 output filter center frequency.

In at least one embodiment, smoothing filter 422 receives the output of select circuit 420 and provides an output with reduced random fluctuations in center frequency $f_C$ and provides that value as center frequency $f_C$ of band rejection filter 340. In at least one embodiment, rather than dynamically calculating filter coefficients for a band-rejection filter having center frequency $f_C$, lower sample rate filter 330 includes difference circuit 424, which computes the difference between the Nyquist frequency $f_S/2$ and center frequency $f_C$, and provides difference $f_S/2-f_C$ to band rejection filter 340, which includes mixer 322, selectable low-pass filter 324, and mixer 326. In at least one embodiment, selectable low-pass filter 324 has a selectable rejection bandwidth that is configured to be a wide rejection bandwidth when rejecting an interfering signal or is configured with a narrow rejection bandwidth (e.g., rejects only a relatively small amount of signal around the Nyquist frequency) in the absence of an interfering signal. In at least one embodiment, selectable low-pass filter 324 is selectively configurable to have a narrow rejection bandwidth with a passband from 0-300 kHz, and to attenuate an input signal by 100 dB at 362.75 kHz to 375 kHz in response to a first value of selection signal SEL and is selectively configurable to have a wide rejection bandwidth with a passband from 0-245 kHz, and to attenuate the input signal by 50 dB at 263.35 kHz to 375 kHz in response to a second value of selection signal SEL. Mixer 322 is a complex mixer that rotates the received signal by $f_S/2-f_C$. Low pass filter 324 attenuates the interfering signal in the stop band of low-pass filter 324, which may include and rejects only a relatively small amount of signal around the predetermined frequency in the absence of an interferer or rejects a larger amount of signal around the estimated center frequency in the presence of an interferer. Mixer 326 is a complex mixer that derotates the IQ signal output by low-pass filter 324 back to baseband (e.g., a low-intermediate frequency) and provides the digital output IQ signals 111.

Note that the bandwidth of the rejection filter may vary with sample rate and a specified IQ mask for a target application. In at least one embodiment, band-rejection filter 340 has one bandwidth instead of a selectively narrow or selectively wide bandwidth. Although band-rejection filter 340 of FIG. 3 includes only one low-pass filter having a selectively wide or selectively narrow bandwidth, in other embodiments, band-rejection filter 340 includes multiple filters coupled in series and configures those filters to adapt to the width of the interferer and additional mixers may be used.

Figure 5:
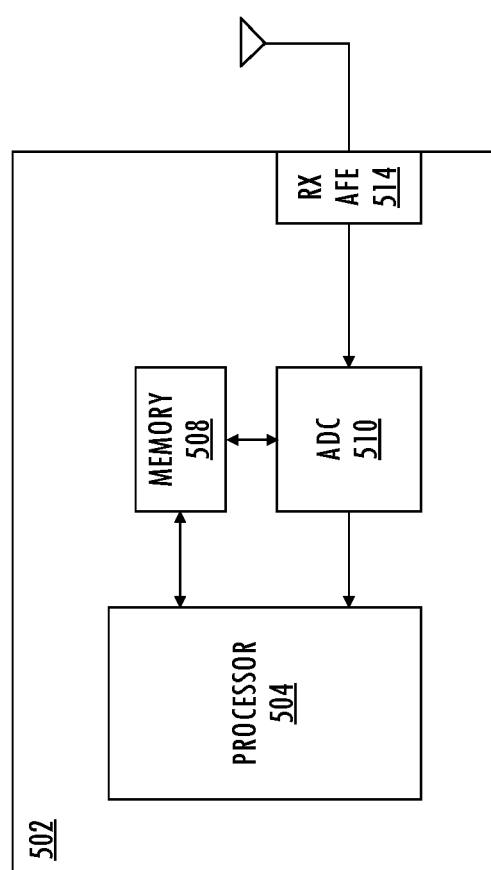
FIG. 5 illustrates a functional block diagram of an exemplary receiver consistent with at least one embodiment of the invention.

Referring to FIG. 5, one or more of structures included in tracking and rejection filter 110 may be implemented using software (which includes firmware) executing on a processor or by a combination of software and hardware. Software, as described herein, may be encoded in at least one tangible (i.e., non-transitory) computer-readable medium. As referred to herein, a tangible computer-readable medium includes at least a disk, tape, or other magnetic, optical, or electronic storage medium (e.g., random access memory, read-only-memory). For example, FIG. 5 illustrates radio 502, which receiver analog front end 514, coupled to an antenna. Processor 504, which may be a digital signal processor or other processing circuit, implements complex data processing, e.g., filtering and modulation, by executing instructions fetched from memory 508. Receiver analog front end 514 and associated antenna receive electromagnetic signals over the air and provide the analog signal to custom hardware circuit implementation of analog-to-digital converter 510, which provides digital data to processor 504. Processor 504 implements complex data processing, e.g., demodulation, filtering, or other signal processing, which may include at least some functions of tracking and rejection filter 110 by executing instructions fetched from memory 508.

Thus, techniques for attenuating large modulated or constant tone interfering signals in a target frequency band to reduce the required dynamic range of a desired signal. Referring to FIG. 1, in at least one embodiment, the precision of digital IQ signals 109 is greater than or equal to the precision of digital IQ signals 113. Embodiments of tracking and rejection filter 110 described above with references to FIGS. 2-4 supply digital output IQ signals 111 to digital automatic gain control 112, which adjusts the band-rejected output IQ signal to the range of available bits of digital IQ signals 113. In at least one embodiment, tracking and rejection filter 110 provides digital IQ signals 111 having a reduced dynamic range as compared to digital IQ signals 109 in response to detection and reduction of an interferer in a target frequency band.

The description of the invention set forth herein is illustrative and is not intended to limit the scope of the invention as set forth in the following claims. The terms "first," "second," "third," and so forth, as used in the claims, unless otherwise clear by context, is to distinguish between different items in the claims and does not otherwise indicate or imply any order in time, location or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for reducing a dynamic range of a received radio frequency signal, the method comprising:
   receiving digital IQ signals corresponding to an in-phase component of the received radio frequency signal and a quadrature component of the received radio frequency signal;
   demodulating the digital IQ signals to generate an instantaneous frequency signal;
   selecting a center frequency of a selectable filter according to whether an interfering signal is detected in a target frequency band of the received radio frequency signal, the center frequency being selected from a predetermined frequency and an estimated center frequency determined using the instantaneous frequency signal; and
   filtering the digital IQ signals using the selectable filter configured using the center frequency to generate output digital IQ signals.

2. The method as recited in claim 1 further comprising low-pass filtering the instantaneous frequency signal to generate a lower sample rate instantaneous frequency signal used to estimate the estimated center frequency of the interfering signal.

3. The method as recited in claim 2 wherein selecting the center frequency of the selectable filter comprises
   selecting between the predetermined frequency and the estimated center frequency to determine a rejection band of the selectable filter based on a first frequency of a highest deviation of the lower sample rate instantaneous frequency signal and a second frequency of a lowest frequency deviation of the lower sample rate instantaneous frequency signal.

4. The method as recited in claim 3 wherein the predetermined frequency is a Nyquist frequency.

5. The method as recited in claim 1 wherein a first dynamic range of the output digital IQ signals is less than a second dynamic range of the digital IQ signals.

6. The method as recited in claim 1 wherein the selectable filter is a band rejection filter having a selectable rejection band.

7. The method as recited in claim 6 the method further comprising
selecting a width of the selectable rejection band based on a ratio of power of a desired signal to total power of the digital IQ signals.

8. The method as recited in claim 1 wherein the selectable filter is a notch filter having a selectable notch frequency.

9. The method as recited in claim 1 wherein selectively updating the selectable filter comprises:
estimating a total power of the digital IQ signals;
estimating power of a desired signal of the digital IQ signals using a first band-pass filter centered around an upper sideband of the digital IQ signals and a second band-pass filter centered around a lower sideband of the digital IQ signals; and
generating a ratio of power of the desired signal to the total power of the digital IQ signals.

10. The method as recited in claim 1 wherein the filtering the digital IQ signals comprises:
mixing the digital IQ signals using the center frequency to generate a rotated signal;
low-pass filtering the rotated signal to generate a filtered IQ signal; and
mixing the filtered IQ signal with the center frequency to provide the output digital IQ signals.

11. A receiver comprising:
a receiver signal path configured to provide digital IQ signals corresponding to an in-phase component of a received radio frequency signal and a quadrature component of the received radio frequency signal;
a demodulator configured to provide an instantaneous frequency signal based on the digital IQ signals;
a selectable filter configured to provide output digital IQ signals based on the digital IQ signals and a center frequency; and
a select circuit configured to select the center frequency of the selectable filter according to whether an interfering signal is detected in a target frequency band of the received radio frequency signal, the center frequency being selected from a predetermined frequency and an estimated center frequency determined using the instantaneous frequency signal.

12. The receiver as recited in claim 11 wherein a first dynamic range of the output digital IQ signals is less than a second dynamic range of the digital IQ signals.

13. The receiver as recited in claim 11 wherein the selectable filter is a notch filter.

14. The receiver as recited in claim 11 wherein the selectable filter is a selectable band-rejection filter comprising:
a first mixer configured to provide rotated digital IQ signals based on the digital IQ signals and the center frequency;
a low-pass filter configured to provide filtered IQ signals based on the rotated digital IQ signals; and
a second mixer configured to provide the output digital IQ signals based on the rotated digital IQ signals and the center frequency.

15. The receiver as recited in claim 14 wherein a bandwidth of the low-pass filter is selectable.

16. The receiver as recited in claim 11 wherein the interfering signal is a constant tone at the center frequency.

17. The receiver as recited in claim 11 wherein the interfering signal is a frequency modulated signal having the center frequency.

18. A program product encoded in a non-transitory machine-readable medium, the program product comprising instructions executable by a processor to:
receive digital IQ signals corresponding to an in-phase component of a received radio frequency signal and a quadrature component of the received radio frequency signal;
demodulate the digital IQ signals to generate an instantaneous frequency signal;
select a center frequency of a selectable filter according to whether an interfering signal is detected in a target frequency band of the received radio frequency signal, the center frequency being selected from a predetermined frequency and an estimated center frequency determined using the instantaneous frequency signal; and
filter the digital IQ signals using the selectable filter to generate an output digital signal.

19. The program product as recited in claim 18, the program product further comprising additional instructions executable by the processor to
update a width of a selectable passband of the selectable filter based on a ratio of power of a modulated signal to total power of the digital IQ signals.

20. The program product as recited in claim 18 wherein the center frequency is selected based on a first frequency of a highest deviation of the instantaneous frequency signal and a second frequency of a lowest frequency deviation of the instantaneous frequency signal.

* * * * *